United States Patent
Menne et al.

(10) Patent No.: US 11,414,086 B2
(45) Date of Patent: Aug. 16, 2022

(54) METHOD AND SYSTEM FOR LOCALIZING AN OCCUPANT WITHIN A VEHICLE

(71) Applicant: APTIV TECHNOLOGIES LIMITED, St. Michael (BB)

(72) Inventors: Roland Menne, Olpe (DE); Christoph Rott, Cologne (DE); Christian Esser, Gummersbach (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 68 days.

(21) Appl. No.: 16/848,901

(22) Filed: Apr. 15, 2020

(65) Prior Publication Data
US 2020/0353935 A1    Nov. 12, 2020

(30) Foreign Application Priority Data
May 6, 2019 (EP) .................................. 19172850

(51) Int. Cl.
*B60W 40/08* (2012.01)
*B60W 40/11* (2012.01)
*B60W 40/112* (2012.01)

(52) U.S. Cl.
CPC ............ *B60W 40/08* (2013.01); *B60W 40/11* (2013.01); *B60W 40/112* (2013.01);
(Continued)

(58) Field of Classification Search
CPC .... B60W 40/08; B60W 40/11; B60W 40/112; B60W 2040/0881; B60W 2420/54;
(Continued)

(56) References Cited

U.S. PATENT DOCUMENTS

2003/0102178 A1 *  6/2003  Ide ...................... B60R 21/0132
                                                                180/282
2004/0242997 A1    12/2004  Griffin et al.
(Continued)

FOREIGN PATENT DOCUMENTS

CN      1240394 A      1/2000
EP      1 729 270 A1   12/2006
(Continued)

OTHER PUBLICATIONS

Extended European Search Report for Application No. EP 19 17 2850 dated Jul. 11, 2019.
(Continued)

*Primary Examiner* — Tyler J Lee
*Assistant Examiner* — Yufeng Zhang
(74) *Attorney, Agent, or Firm* — Carlson, Gaskey & Olds, P.C.

(57) ABSTRACT

A computer implemented method for localizing an occupant within a vehicle includes identifying whether at least one occupant is present within the vehicle based on a signal of an ultrasonic sensor and determining information regarding an inclination of the vehicle based on at least one signal of an inclination sensor. Based on the information regarding inclination of the vehicle, it is determined whether an occupant is present in one of a plurality of predefined sections of the vehicle if the presence of at least one occupant within the vehicle is identified.

15 Claims, 11 Drawing Sheets

(52) U.S. Cl.
CPC . *B60W 2040/0881* (2013.01); *B60W 2420/54* (2013.01); *B60W 2520/16* (2013.01); *B60W 2520/18* (2013.01)

(58) Field of Classification Search
CPC .......... B60W 2520/16; B60W 2520/18; B60R 2021/01306; B60R 21/01542
See application file for complete search history.

(56) References Cited

U.S. PATENT DOCUMENTS

| | | |
|---|---|---|
| 2008/0012696 A1 | 1/2008 | Segura Gordillo et al. |
| 2015/0029338 A1* | 1/2015 | Lee .................... G06K 9/00791 |
| | | 348/148 |
| 2015/0360643 A1* | 12/2015 | Cech ................. B60R 21/01546 |
| | | 297/217.3 |
| 2021/0237620 A1* | 8/2021 | Mizoi .................... B60N 2/002 |

FOREIGN PATENT DOCUMENTS

| | | |
|---|---|---|
| EP | 2746805 A1 | 6/2014 |
| JP | 2005067495 A | 3/2005 |
| JP | 2006273083 A | 10/2006 |
| WO | 2006/137809 A1 | 12/2006 |
| WO | 2018/070252 A1 | 4/2018 |

OTHER PUBLICATIONS

Chinese Application No. 202010303990.1, First Notification of Office Action and Search Report, dated Mar. 4, 2020.

\* cited by examiner

METHOD AND SYSTEM FOR LOCALIZING AN OCCUPANT WITHIN A VEHICLE

CROSS REFERENCE TO RELATED APPLICATION

This application claims priority to European Patent Application No. 19172850.0, filed on May 6, 2019.

FIELD

The present disclosure relates to methods and systems for localizing an occupant within a vehicle.

BACKGROUND

For specific automotive applications, a valuable input is reliable information if any occupant is present within a compartment of a vehicle. This is especially the case for functions and systems being available in a parking condition of the vehicle. Furthermore, it may also be valuable information for automotive applications if an occupant is really entering or leaving a vehicle to or from a certain seat after a door of the vehicle has been opened.

In modern vehicles, seatbelt reminders, cameras or similar systems may be used to localize an occupant within a vehicle. However, there are no seatbelt reminders on the rear seats of many vehicles. In addition, seatbelt reminders, cameras and many other safety systems of a vehicle may be switched off when the vehicle is in a parking condition, i.e. when the powertrain and/or the ignition of the vehicle are switched off, since the overall current consumption of the seatbelt reminders, cameras and similar systems may be too high.

Accordingly, there is a need to provide a method and a system which are able to localize an occupant within a parking vehicle and which have low requirements regarding power consumption and necessary equipment.

SUMMARY

In one aspect, the present disclosure is directed at a computer implemented method for localizing an occupant within a vehicle. According to the method, it is identified whether at least one occupant is present within the vehicle based on a signal of an ultrasonic sensor, and information is determined regarding inclination of the vehicle based on at least one signal of an inclination sensor. Based on the information regarding inclination of the vehicle it is determined whether an occupant is present in one of a plurality of predefined sections of the vehicle if the presence of at least one occupant within the vehicle is identified.

Since an ultrasonic sensor and an inclination sensor are already available in modern vehicles, no additional equipment is required in order to carry out the method. Instead, the method steps may be implemented through suitable software functions within an existing computer system of the vehicle.

In addition, an ultrasonic sensor and an inclination sensor usually have a low current consumption, especially in comparison to seatbelt reminders and cameras. Therefore, the method may be carried out permanently, for example, at predetermined time intervals, even in a parking condition of the vehicle when the ignition or any other control for a powertrain of the vehicle is switched off and there is no power supply available for many electric systems of the vehicle.

The information regarding inclination of the vehicle is used for the localization of an occupant only if the presence of at least one occupant is identified based on the signal of the ultrasonic sensor. Therefore, the information based on the at least one signal of the inclination sensor is confirmed by the signal of the ultrasonic sensor which provides reliability to the method when localizing an occupant.

The method may further comprise one or more of the following features.

At least one reference level may be determined for the at least one signal of the inclination sensor when no presence of any occupant is identified by the signal of the ultrasonic sensor. The inclination sensor may provide a longitudinal inclination signal indicating the inclination of the vehicle with respect to a longitudinal axis of the vehicle and a lateral inclination signal indicating the inclination of the vehicle with respect to a lateral axis of the vehicle, and the predetermined sections may be related to ranges of the longitudinal inclination signal and the lateral inclination signal. The plurality of predetermined sections may comprise at least two sections and the presence of an occupant in one of the predetermined sections may be determined based on the sign of the longitudinal inclination signal and/or the sign the lateral inclination signal. The information regarding inclination of the vehicle may comprise a change of the at least one signal of the inclination sensor, the change being greater than a predetermined threshold within a predefined time period. A number of occupants entering or leaving the vehicle may be determined by the change of the at least one signal of the inclination sensor. Determining whether an occupant is present in one of the plurality of predefined sections of the vehicle may be performed only if a powertrain of the vehicle is switched off. At least one additional device being arranged within the vehicle and being configured to localize an occupant within the vehicle may be activated for a predefined short time period in order to confirm the presence of the occupant in one of the plurality of predefined sections of the vehicle. The presence of at least one occupant within the vehicle may be identified based on a movement and/or a respiration of the occupant which is detected based on the signal of the ultrasonic sensor.

According to an embodiment, at least one reference level is determined for the at least one signal of the inclination sensor when no presence of any occupant is identified by the signal of the ultrasonic sensor. Therefore, the inclination sensor is additionally coupled to the ultrasonic sensor which defines a time period in which at least one reference level or baseline is defined for the at least one signal of the inclination sensor. The presence of an occupant in one of the predefined sections may be determined based on a comparison of the at least one signal of the inclination sensor and the at least one reference level. Thus, due to the determination of the at least one reference level the reliability of the method may be improved.

The inclination sensor may provide a longitudinal inclination signal indicating the inclination of the vehicle with respect to a longitudinal axis of the vehicle and a lateral inclination signal indicating the inclination of the vehicle with respect to a lateral axis of the vehicle. The predetermined sections may be related to ranges of the longitudinal inclination signal and the lateral inclination signal. The longitudinal axis and the lateral axis may be defined with respect to a center of gravity of the vehicle. In other words, the center of gravity of the vehicle defines an origin of a coordinate system which defines the longitudinal axis and the lateral axis of the vehicle. The ranges of the longitudinal and lateral inclination signals may correspond to rectangles in a plan view of the vehicle which represent the predetermined sections. Therefore, the predetermined sections may correspond to seats and/or a trunk of the vehicle, for example. Thus, the localization of an occupant within the vehicle is improved by the inclination sensor providing the longitudinal and lateral inclination signals.

In addition, the plurality of predetermined sections may comprise at least two sections and the presence of an occupant in one of the predetermined sections may be determined based on the sign of the longitudinal inclination signal and/or the sign of the lateral inclination signal. By considering the signs of the longitudinal and lateral inclination signals only and their relationship to the at least two sections the determination of the predefined section in which the occupant is present may be simplified.

If there are two sections considered only, this may correspond to a vehicle having two seats only or to two rows of seats in a vehicle having more than four seats. According to a further example, a vehicle having at least four seats may be considered. For a compartment of such a vehicle, four sections may be defined, i.e. two sections for a front row of seats and two sections for a rear row of seats. For this example, if the longitudinal inclination signal has a positive sign, the occupant may be present on one of the front seats of the vehicle, whereas a negative sign of the longitudinal inclination signal may indicate a presence of the occupant on one of the rear seats. Similarly, a positive sign of the lateral inclination signal may indicate a presence of the occupant on the right side of the vehicle, whereas the occupant may be located on the left side of the vehicle if the lateral inclination signal is negative. Furthermore, if the occupant is present in the middle of rear seats, the lateral inclination signal may be approximately zero, whereas the longitudinal inclination signal may be negative. In summary, a clear correspondence between seats within a compartment of the vehicle and the signs of the longitudinal and lateral inclination signals may be provided.

It may depend on a location of the center of gravity of the vehicle how the localization of the occupant based on the sign of the longitudinal inclination signal and/or of the sign of the lateral inclination signal is performed in detail. Therefore, the present embodiment may be vehicle specific. Based on the position of the center of gravity for a specific vehicle, it may be decided whether a signal of a further sensor is to be considered additionally for the localization of the occupant. For example, the signal of the ultrasonic sensor may be analyzed in order to determine whether at least one occupant is located on front seats of the vehicle.

According to a further embodiment, the information regarding inclination of the vehicle comprises a change of the at least one signal of the inclination sensor, wherein the change is greater than a predetermined threshold within a predefined time period. Since the change of the at least one signal of the inclination sensor is therefore required to have at least a predetermined absolute value for determining the presence of an occupant in one of the predefined sections, an erroneous determination of the presence of an occupant due to a disturbed or noisy signal from the inclination sensor may be avoided. In addition, the entrance of an occupant to a compartment of the vehicle may be detected by the change of the at least one signal of the inclination sensor.

Furthermore, a number of occupants entering or leaving the vehicle may be determined by the change of the at least one signal of the inclination sensor. For example, an absolute value of the change may be defined which corresponds to an average weight of an occupant. The number of occupants entering or leaving the vehicle may correspond to multiples of this absolute value. If more than one signal of the inclination sensor is available, various absolute values may be defined for the changes of these signals. Therefore, the number of occupants identified as entering or leaving the vehicle may be cross-checked by the changes of various signals. For example, signals of door switches may be additionally considered. Although the number of occupants determined by this means may be a rough estimate due to the diversity of occupants with respect to weight, even a rough estimate for the number of occupants or their total weight may be a valuable input for further automotive applications.

Determining whether an occupant is present in one of a plurality of predefined sections of the vehicle may be performed only if a powertrain of the vehicle is switched off. Therefore, the method may be carried out only if the vehicle is in a stopped position or is going to be parked. The method may be provided for these conditions in which conventional devices like seatbelt reminders are switched off due to high current consumption. The localization of occupants by the method when the vehicle is in a stopped or parked state may improve the security for the occupants and may provide valuable input for further applications which input may be not be available from conventional devices. Thus, the comfort for occupants remaining in a stopped or parked vehicle may be improved.

According to an embodiment, at least one additional device being arranged within the vehicle and being configured to localize an occupant within the vehicle is activated for a predefined short time period in order to confirm the presence of the occupant in one of the plurality of predefined sections of the vehicle. The additional device may be a seatbelt reminder, a camera or a similar system having a high current consumption during normal operation. According to the embodiment, however, the additional device is operated for a short time period only. Therefore, the reliability of the localization of an occupant is improved by the activation of the additional device for a short time without a substantial increase of current consumption.

The presence of at least one occupant within the vehicle may be identified based on a movement and/or a respiration of the occupant which is detected based on the signal of the ultrasonic sensor. The movement and/or respiration of the occupant may be identified based on an interference between a signal transmitted by the ultrasonic sensor and a reflected ultrasonic signal. By detecting the interference, just the breathing of an occupant which is not moving may be detected. Therefore, the identification of the presence of at least one occupant within the vehicle may be improved providing a reliable prerequisite for the localization of the occupant being performed thereafter based on the at least one signal of the inclination sensor.

In another aspect, the present disclosure is directed at a system for localizing an occupant within a vehicle. The system comprises an ultrasonic sensor providing a signal indicating whether at least one occupant is present within the vehicle, an inclination sensor providing at least one signal indicating inclination of the vehicle, and a localization module receiving the signal of the ultrasonic sensor and the at least one signal of the inclination sensor. The localization module is configured to determine whether an occupant is present in one of a plurality of predetermined sections of the vehicle based on the at least one signal of the inclination sensor if the signal of the ultrasonic sensor indicates the presence of at least one occupant within the vehicle.

Since the ultrasonic sensor and the inclination sensor may already be available in the vehicle, the only additional requirement for implementing the system is the localization module which may be a pure software module within an existing computer system of the vehicle. Therefore, there are no additional hardware requirements for implementing the system. In addition, the components of the system, i.e. the ultrasonic sensor, the inclination sensor and the localization module have a low current consumption which allows operating the system when the vehicle is in a parking condition.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor.

The inclination sensor may be configured to provide a longitudinal inclination signal indicating the inclination of the vehicle with respect to a longitudinal axis of the vehicle and a lateral inclination signal indicating the inclination of the vehicle with respect to a lateral axis of the vehicle, and the predetermined sections may be related to ranges of the longitudinal inclination signal and the lateral inclination signal.

The localization module may be configured to determine at least one reference level for the at least one signal of the inclination sensor when the signal of the ultrasonic sensor does not indicate the presence of any occupant within the vehicle.

The system may further comprise at least one additional device being arranged within the vehicle and being configured to localize an occupant within the vehicle and to be activated for a predefined short time period in order to confirm the presence of the occupant in one of the plurality of predefined sections of the vehicle.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, which schematically show various features.

DETAILED DESCRIPTION

Figure 1:
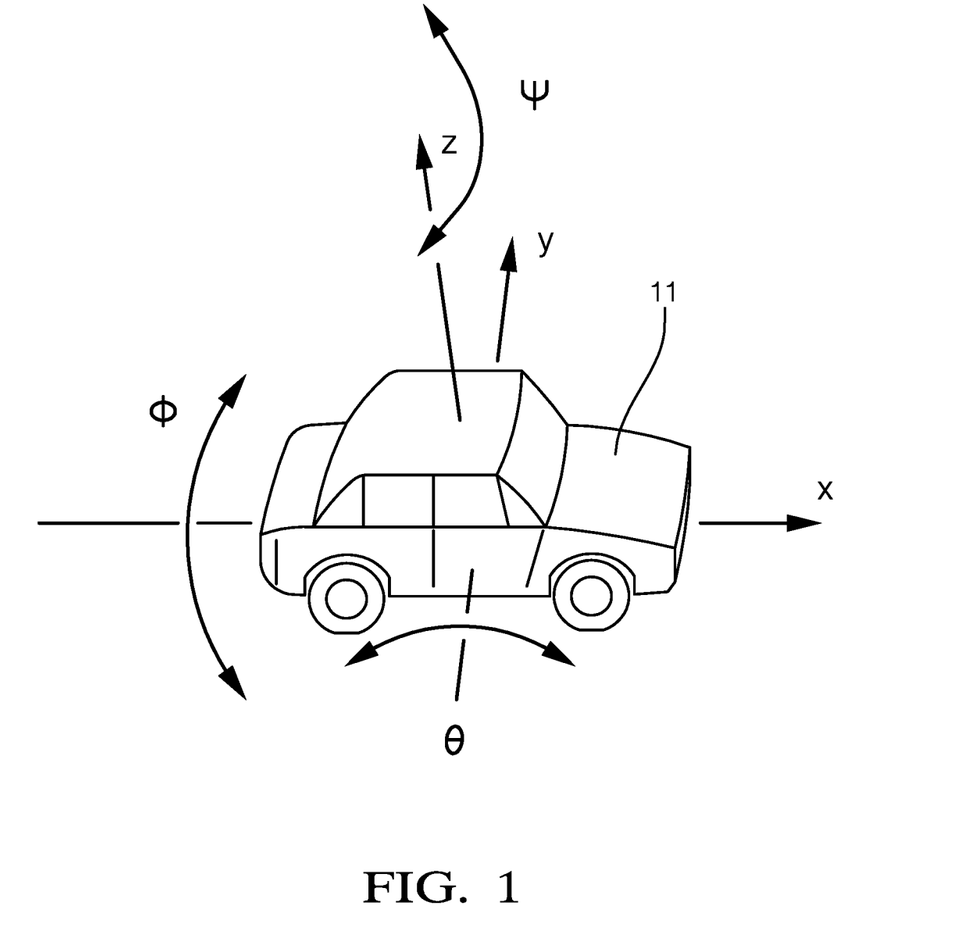
FIG. 1 depicts a vehicle and a vehicle coordinate system.

FIG. 1 depicts a vehicle 11 in a perspective view together with a vehicle coordinate system which has its origin at the center of gravity of the vehicle 11. An x-axis of the coordinate system is aligned along a longitudinal axis of the vehicle 11 in forward direction of vehicle movement, whereas a y-axis of the coordinate system is aligned along a lateral axis of the vehicle 11. If the vehicle 11 is empty, i.e. if there are no occupants or other loads are located within the vehicle, the x-axis and the y-axis are aligned parallel to a ground plane on which the vehicle 11 is located. Furthermore, a z-axis of the coordinate system is aligned perpendicular to the ground plane for an empty vehicle 11.

In order to describe an orientation of the vehicle 11, a roll angle $\phi$, a pitch angle $\theta$ and a yaw angle $\psi$ are typically used. As shown in FIG. 1, the roll angle $\phi$ describes a rotation of the vehicle around the x-axis, whereas the pitch angle $\theta$ describes a rotation around the y-axis, and the yaw angle $\psi$ describes a rotation around the z-axis. In addition, the roll angle $\phi$ indicates an inclination of the y-axis, i.e. of the lateral axis of the vehicle 11, whereas the pitch angle $\theta$ indicates an inclination of the x-axis, i.e. of the longitudinal axis of the vehicle 11.

Figure 2:
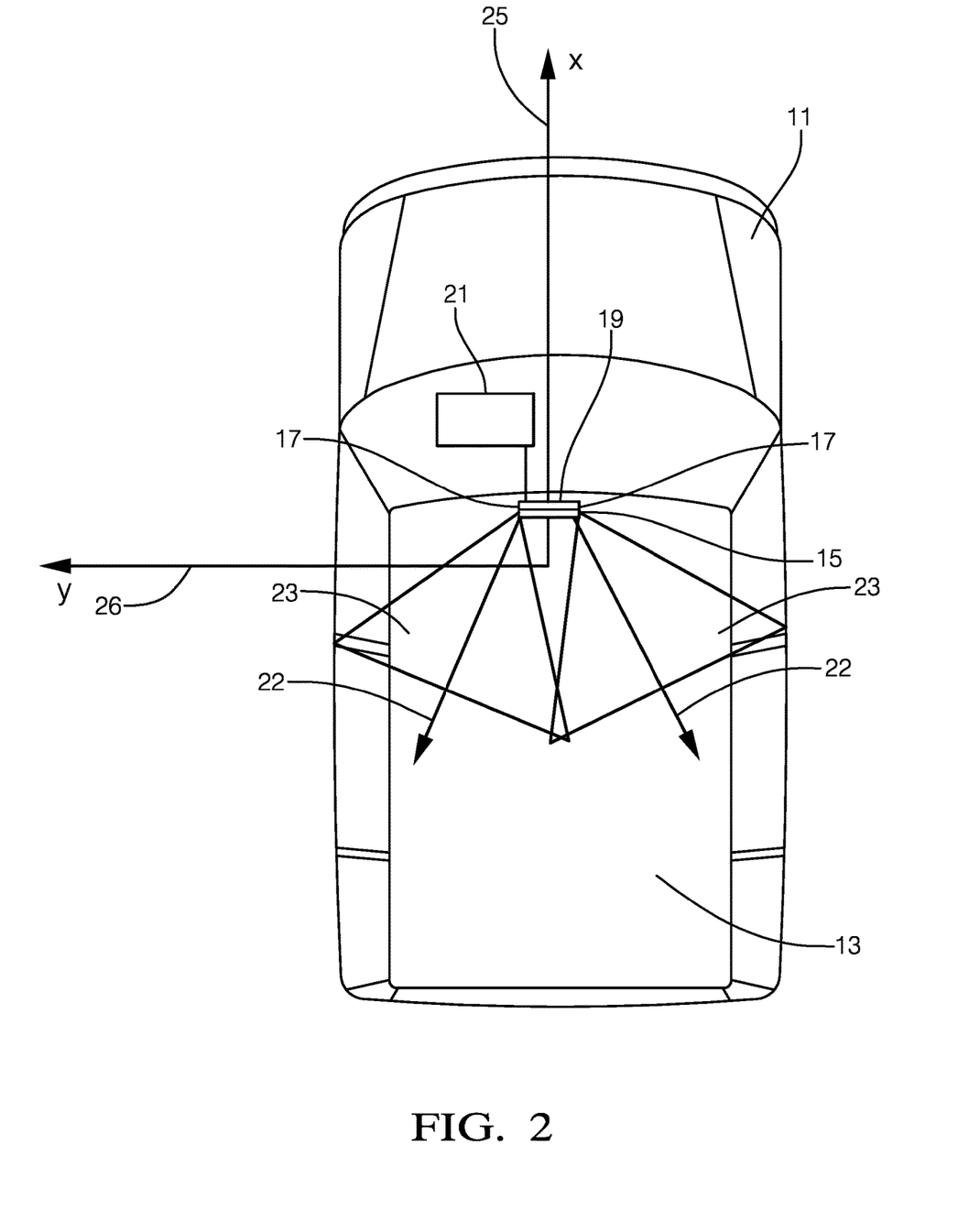
FIG. 2 depicts a schematic plan view of the vehicle comprising a system for carrying out a method according to the disclosure.

FIG. 2 depicts the vehicle 11 schematically in plan view. The vehicle 11 comprises a compartment 13 for occupants. Within the compartment 13, a roof module 15 is arranged close to a windscreen of the vehicle 11.

The roof module 15 comprises an ultrasonic sensor 17 and an inclination sensor 19 which are connected to a localization module 21. Although the localization module 21 is depicted as a separate component, the localization module 21 is no separate hardware component but just a software module being implemented within a computer system (not shown) of the vehicle 11. The signals of the ultrasonic sensor 17 and the signals of the inclination sensor 19 are captured by the computer system and provided to the localization module 21 which carries out a computer implemented method for localizing an occupant within the vehicle 11 according to the disclosure.

The inclination sensor 19 is embodied as an accelerometer being part of the roof module 15. The accelerometer usually measures a change of the position of the vehicle 11. In a static state, however, i.e. if the velocity of the vehicle 11 is zero, the accelerometer measures the vector of the acceleration of gravity. A change of this vector with respect to the vehicle coordinate system (see FIG. 1) is used to calculate the inclination of the vehicle 11. Since the accelerometer measures the inclination in the static state only, the method according the present disclosure is also performed in static state only. Accordingly, the localization module 21 will be switched off if the vehicle 11 starts moving.

According to the present example, the ultrasonic sensor 17 comprises two units each having an alignment being represented by an arrow 22, and a respective field of view 23. For the vehicle 11, a coordinate system is defined having an origin 24 at the center of gravity of the vehicle 11 as well as a longitudinal axis or x-axis 25 and a lateral axis or y-axis 26. As will be explained below, the signals of the inclination sensor 19 are referred to the longitudinal axis and the lateral axis, respectively, of the vehicle 11.

According to the present embodiment, the inclination sensor 19 (accelerometer) is integrated in the ultrasonic sensor 17. Such an integrated inclination sensor 19 being arranged inside an ultrasonic alarm sensor is available in many modern vehicles for an anti-tow protection. That is, if vehicle 11 is in a parking condition and someone tries to tow the vehicle, the inclination sensor 19 detects an undesired inclination of the vehicle and provides a corresponding alarm. Since an ultrasonic sensor 17 comprising an integrated inclination sensor 19 may already be available within the vehicle 11, the implementation of the localization module 21 via suitable software functions is required only for carrying out the method according to the present disclosure.

The arrangement of the roof module 15 is not restricted to the position close to the windscreen of the vehicle. Instead, the roof module 15 may also be located at a location in the middle of the compartment 13. In this case, the roof module 15 may comprise four units of the ultrasonic sensor 17 being aligned in four different directions, as well as corresponding units of the inclination sensor 19.

The ultrasonic sensor 17 is able to identify whether at least one occupant is present within the vehicle 11. In detail, the ultrasonic sensor 17 may even localize an object or an occupant being located within the field of view 23 of the ultrasonic sensor 17. Beyond the field of view 23 of the ultrasonic sensor 17, i.e. in the rear part of the vehicle 11, the ultrasonic sensor 17 may be able to detect the existence of a living occupant only without being able to perform his localization.

In detail, the ultrasonic sensor 17 transmits a signal which may be reflected by objects within the compartment 17 of the vehicle 11 including a living occupant. The reflected ultrasonic signal interferes with the original transmitted signal, and the interference of these two signals may be detected by the ultrasonic sensor 17. From an amplitude modulation of the interference signal a movement and/or a respiration of an occupant can be detected. That is, the breathing of the occupant can be identified from the interference signal even if the occupant is not moving. For the localization of the occupant within the compartment 13, however, a fusion of the signals provided by the ultrasonic sensor 17 and of the signals provided by the inclination sensor 19 is required as will be explained below.

Figure 3:
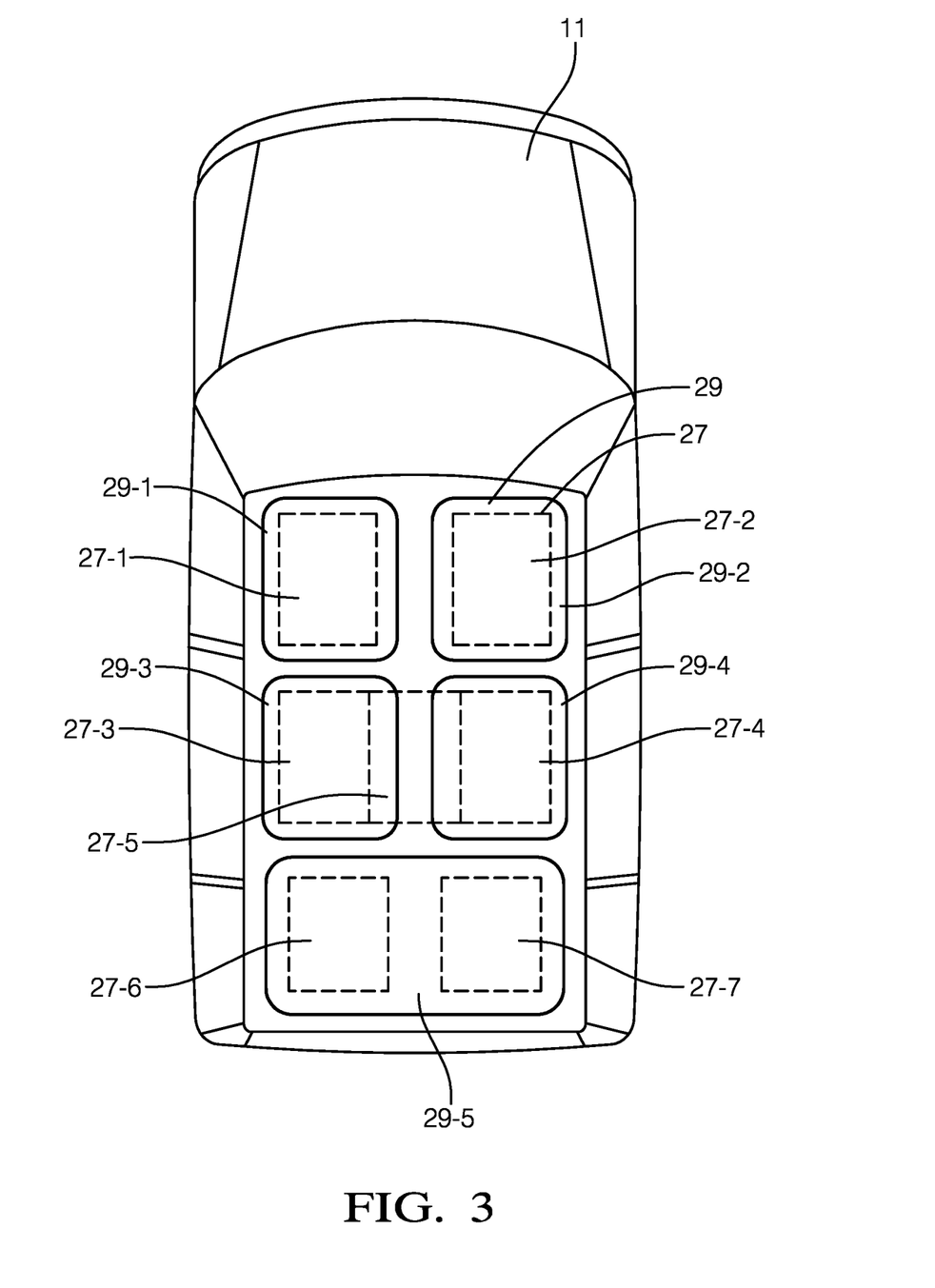
FIG. 3 depicts the vehicle as shown in FIGS. 1 and 2 comprising predefined sections.

FIG. 3 depicts the vehicle 11 as shown in FIGS. 1 and 2 comprising seats 27 for occupants. The seats 27 are delineated by dashed lines. In addition, predefined sections 29 of the compartment 13 within the vehicle 11 are shown. The predefined sections 29 cover the region in which the seats 27 for occupants are arranged. The first four predefined sections 29-1, 29-2, 29-3 and 29-4 correspond to the region in which front seats 27-1, 27-2 and two of the rear sets 27-3, 27-4 are located. A middle rear seat 27-5 has no corresponding predefined section 29, whereas a left auxiliary seat 27-6 and a right auxiliary seat 27-7 are arranged within a predefined trunk section 29-5.

Although there is no one-to-one relationship between the seats 27 and the predefined sections 29, a localization of an occupant at any of the seats is possible based on the signals of the inclination sensor 19, as will be explained below. As an alternative, a one-to-one relationship between the seats 27 for occupants and the predefined sections 29 may be defined.

Figure 4:
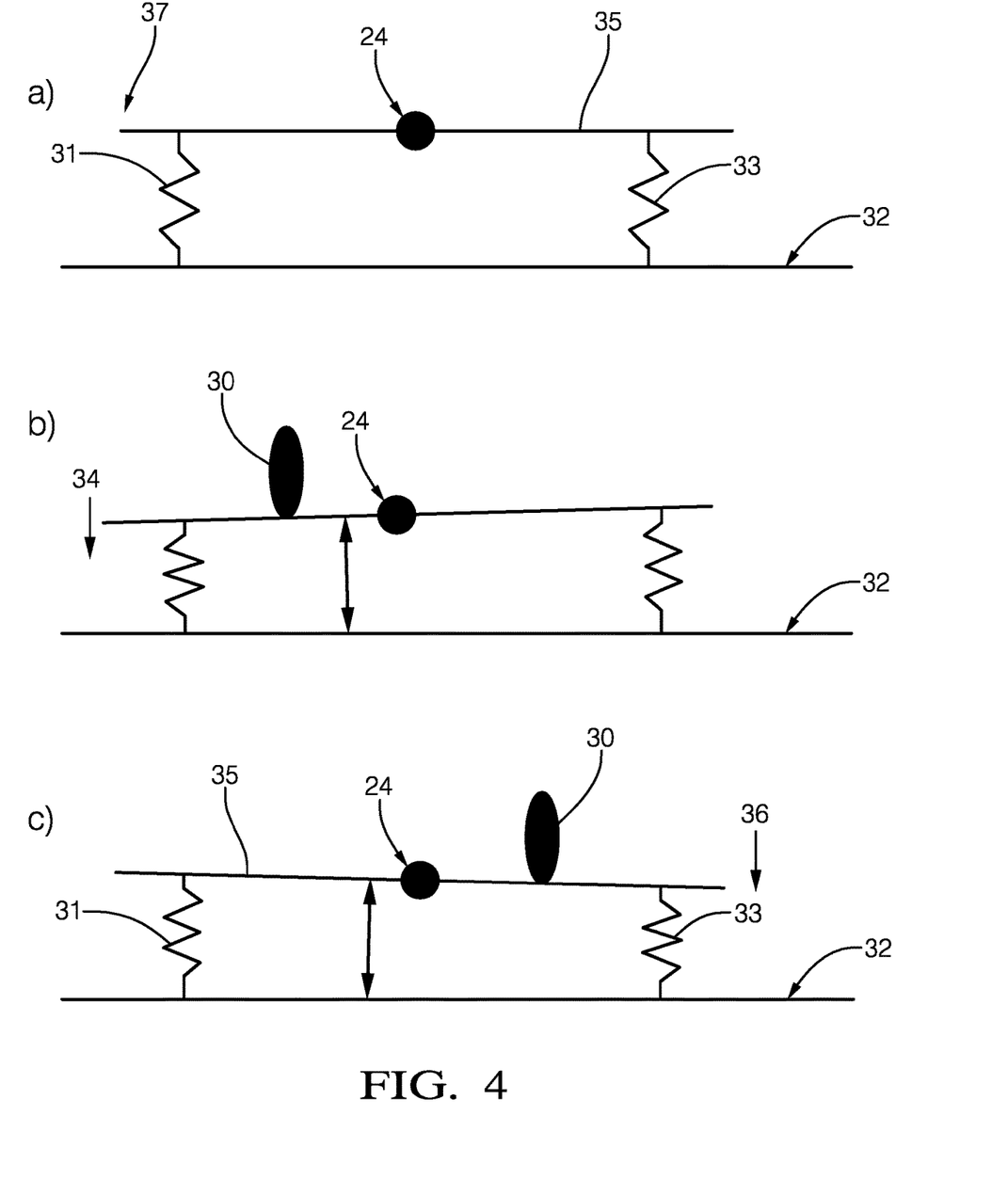
FIG. 4 depicts an inclination of the vehicle schematically if the center of gravity is located in the middle of the vehicle.

FIGS. 4a), 4b) and 4c) schematically illustrate an inclination of the vehicle 11 caused by an occupant 30 if the center of gravity 24 of the empty vehicle 11 is located approximately in the middle between a front suspension 31 and a rear suspension 33 of a body (not shown) of the vehicle 11. Instead of the body, its longitudinal axis 35 is depicted corresponding to the x-axis as shown in FIG. 1. The front of the vehicle is indicated by an arrow 37.

FIG. 4a) shows an initial situation for an empty vehicle 11. The longitudinal axis 35 of the vehicle body is aligned parallel to the ground 32 on which the vehicle 11 is located. In this situation the ultrasonic sensor 17 indicates that the vehicle is empty and that a calibration may be performed in order to determine a reference level 45 (see FIGS. 5 and 6) for the signals of the inclination sensor 19.

In FIG. 4b), the occupant 30 has entered the vehicle through a front door and is located e.g. on one of the front seats 27-1, 27-2 (see FIG. 3). Due to the weight of the occupant 30, the longitudinal axis 35 of the vehicle body is inclined to the front 37 as indicated by the arrow 34. As a consequence, the inclination sensor 19 provides a positive signal, for example, for the pitch angle θ with respect to the reference level 45 being determined in advance.

In FIG. 4c), the occupant 30 has entered the vehicle through a rear door and is located e.g. on one of the rear seats 27-3, 27-4, or 27-5 (see FIG. 3). In this case, the longitudinal axis 35 of the vehicle body is inclined to the rear as indicated by the arrow 36. With respect to the situation as shown in FIG. 4b), the inclination sensor 19 provides a signal having an opposite sign, e.g. a negative signal, for the pitch angle θ.

In FIGS. 5, 6, 8, 9 and 10, examples for signals of the inclination sensor 19 are depicted. The inclination sensor 19 provides two different signals, a longitudinal signal 41 corresponding to the pitch angle θ and a lateral signal 43 corresponding to the roll angle φ. The longitudinal signal 41 indicates an inclination of the vehicle 11 along the longitudinal axis 35 or x-axis 25 (see FIGS. 2, 4, and 7), whereas the lateral signal 43 indicates an inclination of the vehicle 11 along the lateral axis or y-axis 26 (see FIG. 2). The signals 41, 43 of the inclination sensor 19 are presented as a function of time t.

Before the signals shown in FIGS. 5, 6, 8, 9 and 10 are determined, the reference level or baseline 45 is determined for both signals 41, 43. The reference level or baseline 45 is measured within a time period in which the ultrasonic sensor 17 indicates that no occupant is present within the vehicle 11, e.g. in a situation as shown is FIG. 4a). The baseline 45 is regarded as a zero level for the signals 41, 43.

Figure 5:
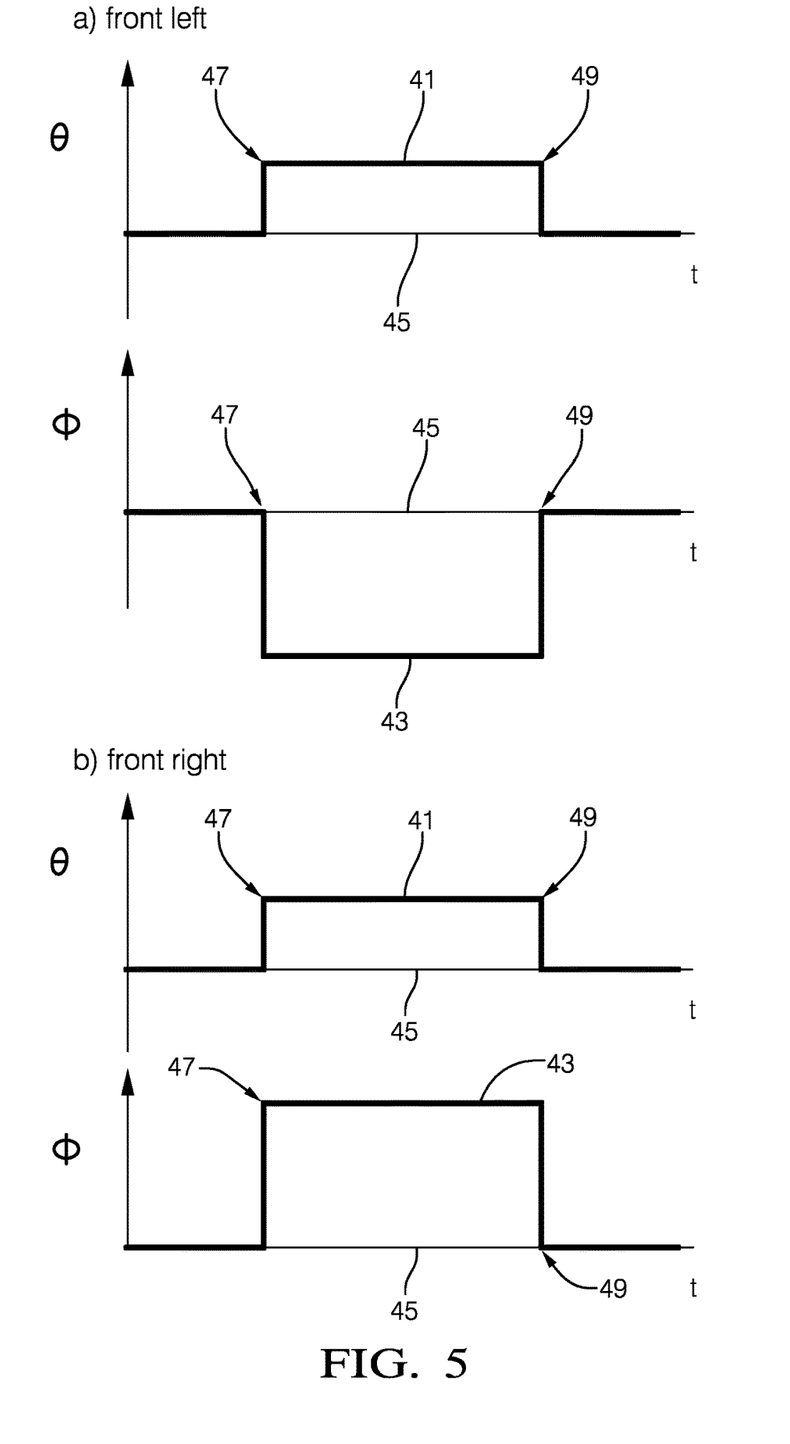
FIG. 5 depicts an example for signals of an inclination sensor for the vehicle according to FIG. 4.
Figure 6:
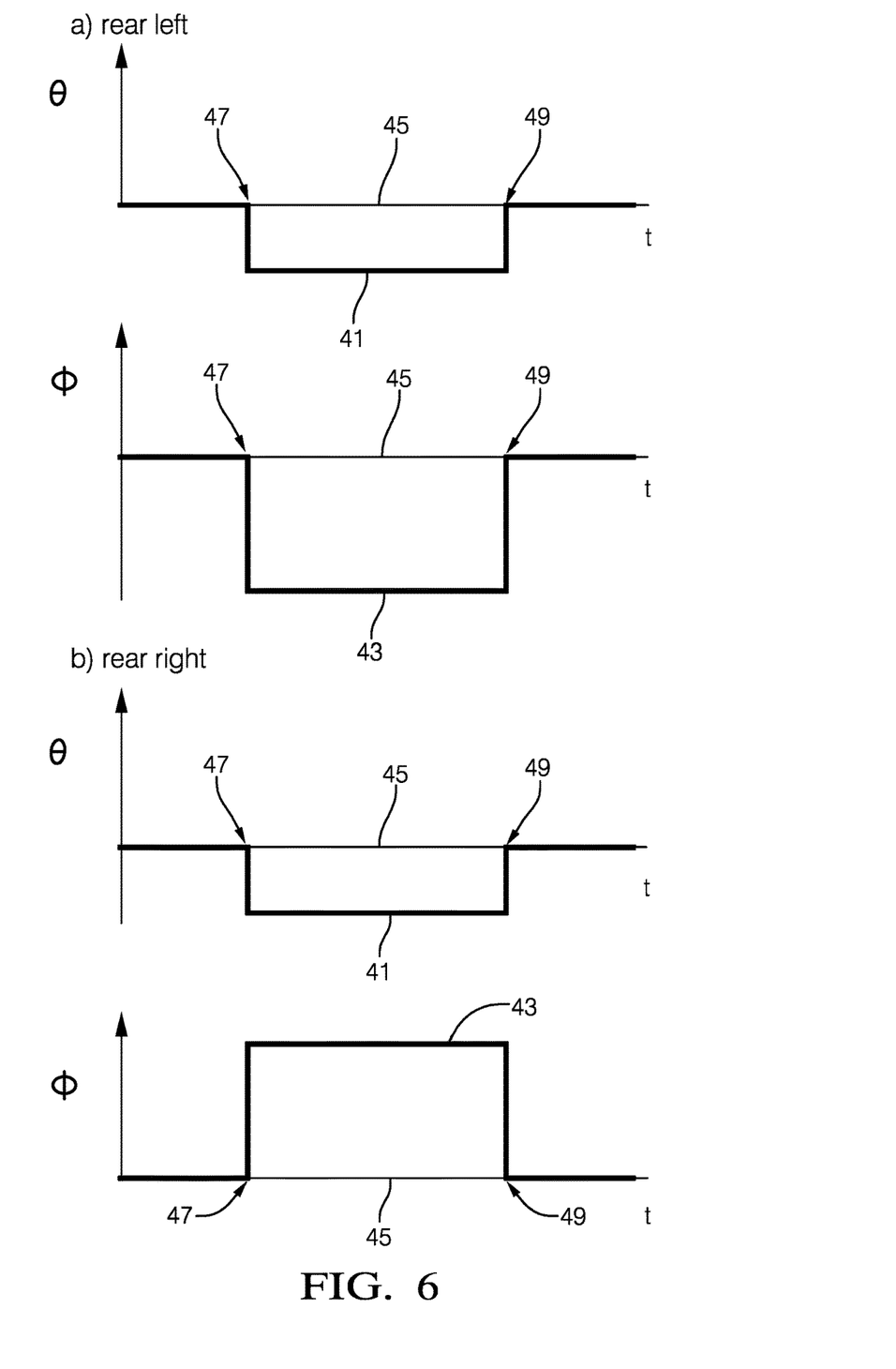
FIG. 6 depicts another example for signals of the inclination sensor for the vehicle according to FIG. 4.

The signals depicted in FIGS. 5 and 6 correspond to the situations as shown in FIGS. 4b) and 4c), respectively. The center of gravity of the vehicle 11 is located in the middle between the front and rear suspensions 41, 43 as shown in FIG. 4a).

In FIG. 5, the signals 41, 43 of the inclination sensor 19 are depicted for an occupant entering the compartment 13 of the vehicle 11 through the front left door (FIG. 5a)) or through the front right door (FIG. 5b)) and leaving the vehicle 11 again. In detail, the occupant enters the vehicle 11 at an instant of time indicated by 47, whereas he leaves the vehicle again at an instant of time indicated by 49.

At the instant of time indicated by 47, the longitudinal signal 41 (pitch angle θ) increases indicating a forward inclination of the vehicle 11 as shown in FIG. 4b). At the same instant of time indicated by 47, the lateral signal 43 (roll angle φ) decreases with respect to the baseline 45 indicating an inclination of the vehicle 11 to the left side.

In summary, the increase of the longitudinal signal 41 (pitch angle θ) and the decrease of the lateral signal 43 (roll angle φ) indicate an inclination of the vehicle 11 to its front left part. If the ultrasonic sensor 17 detects the presence of an occupant within the compartment 13 of the vehicle 11, e.g. by detecting his breathing, the signals 41, 43 of the inclination sensor 19 as shown in FIG. 5a) indicate the presence of the occupant within the left front section 29-1 (see FIG. 3). That is, the occupant is localized at the left front seat by the signals 41, 43 as shown in FIG. 5a).

At the instant of time indicated by 49, the occupant leaves the vehicle 11 again, and therefore the signals 41, 43 return to the reference level or baseline 45 for all situations as shown in FIGS. 5, 6, 8, 9 and 10.

If the occupant enters the vehicle 11 through the front right door (see FIG. 5b), the longitudinal signal 41 (pitch angle θ) increases in the same manner as shown in FIG. 5a) indicating an inclination of the vehicle 11 to the front. The lateral signal 43 (roll angle φ), however, increases at the instant of time indicated by 47 instead of the decrease as shown in FIG. 5a). Due to the different sign of the lateral signal 43 (roll angle φ) with respect to the corresponding lateral signal 43 shown in FIG. 5a), the lateral signal 43 shown in FIG. 5b) indicates an inclination of the vehicle 11 to the right side. Therefore, the occupant is localized in the right front section 29-2 corresponding to the right front seat 27-2 (see FIG. 3) by the signals 41, 43 as shown in FIG. 5b).

In FIG. 6, the signals 41, 43 are depicted for an occupant entering the compartment 13 of the vehicle 11 through the rear left door (FIG. 6a)) or alternatively through the rear right door (FIG. 6b)) at the instant of time indicated by 47 and leaving the vehicle again at the later instant of time indicated by 49. The only difference for the signals 41, 43 shown in FIG. 6 with respect to the signals shown in FIG. 5 relates to the longitudinal signal 41 (pitch angle θ) which decreases with respect to the baseline 45 in FIG. 6, whereas the corresponding longitudinal signal 41 increases according to FIG. 5. That is, the longitudinal signals 41 (pitch angle θ) shown in FIG. 6a) and FIG. 6b) indicate an inclination of the vehicle 11 to the rear side as shown in FIG. 4c) due to the different sign of the longitudinal signal 41 with respect to the corresponding longitudinal signals 41 shown in FIG. 5a) and FIG. 5b).

Due to the decrease of the longitudinal signal 41 (pitch angle θ), the occupant is localized in the region of the sections 29-3 or 29-4, i.e. in the region of the rear seats 27-3, 27-4, by the signals 41, 43 of the inclination sensor 19 as shown in FIG. 6. Furthermore, due to the decrease of the lateral signal 43 (roll angle φ) as shown in FIG. 6a), the occupant is localized in the left rear section 29-3 (see FIG. 3) by the signals 41, 43 as shown in FIG. 6a). In contrast, the occupant is localized in the right rear section 29-4 by the signals as shown in FIG. 6b) due to the increase of the lateral signal 43 (roll angle φ) with respect to the baseline 45.

The signals 41, 43 of the inclination sensor for the four situations as depicted in FIGS. 5a), 5b), 6a) and 6b), respectively, differ from each other by at least one sign if the baseline 45 is regarded as zero level. Accordingly, if just the sign of the signals 41, 43 is determined with respect to the baseline 45, it is possible to decide in which of the four sections 29-1, 29-2, 29-3 or 29-4 the occupant 30 is located. Thus, the occupant 30 can be localized based on the sign of signals 41, 43 only without considering the magnitude of the signals for the situations as shown in FIG. 4, i.e. if the center of gravity of the vehicle 11 is located approximately in the middle between the front suspension 31 and the rear suspension 33.

Figure 7:
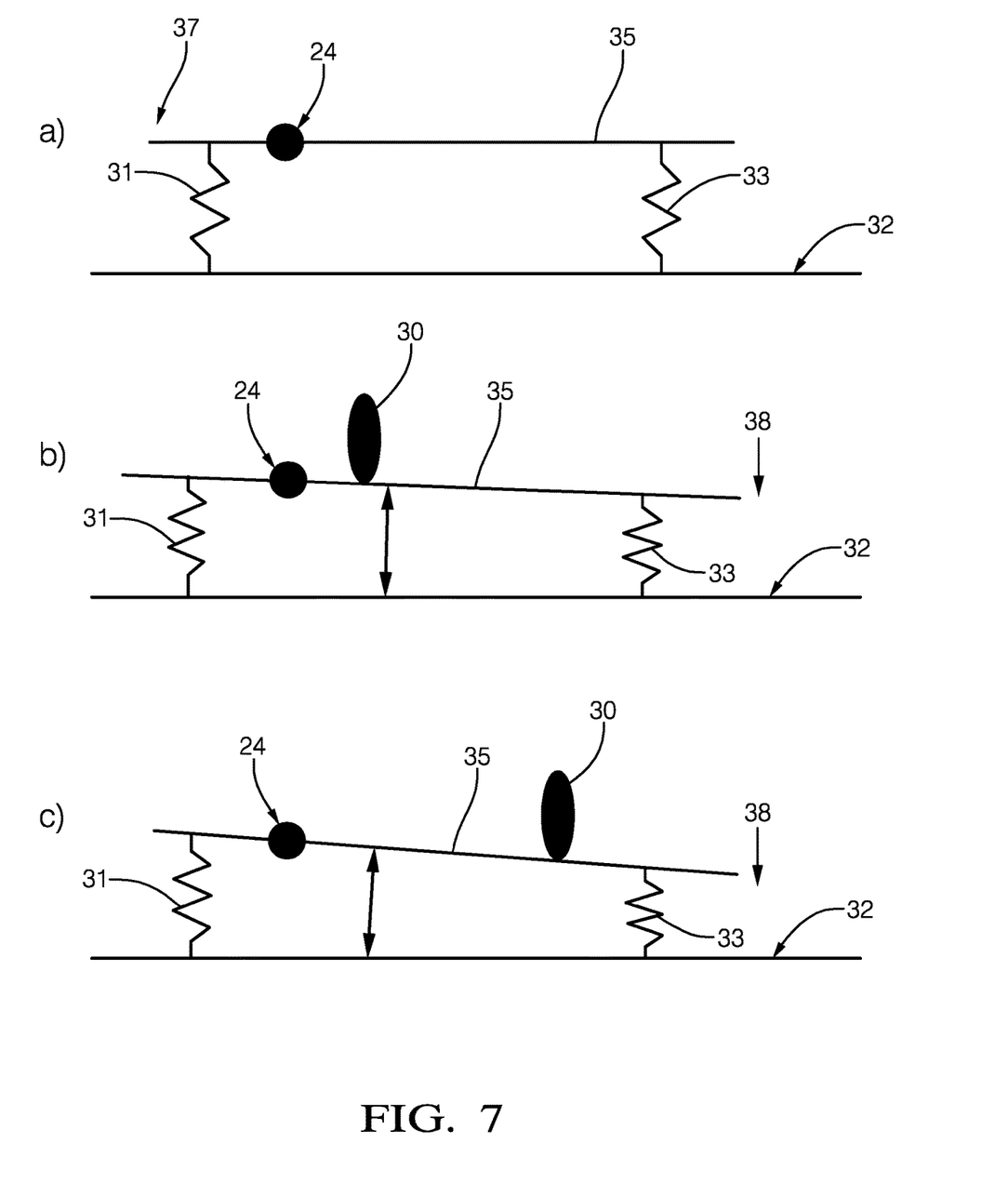
FIG. 7 depicts an inclination of the vehicle schematically if the center of gravity is located in the front part of the vehicle.

FIGS. 7a), 7b) and 7c) schematically illustrate the inclination of the vehicle 11 caused by an occupant 30 if the center of gravity 24 of the empty vehicle 11 is located close to the front suspension 31 of the vehicle body. The front of the vehicle is again indicated by the arrow 37.

FIG. 7a) shows the initial situation for an empty vehicle 11 in which the longitudinal axis 35 is aligned parallel to the ground 32. In the initial situation the ultrasonic sensor 17 indicates that the vehicle is empty and that a calibration may be performed in order to derive the reference level 45 (see FIGS. 8 and 9) for the signals of the inclination sensor 19.

In FIG. 7b), the occupant 30 has entered the vehicle through a front door and is located e.g. on one of the front seats 27-1, 27-2 (see FIG. 3). In contrast to the situation as shown in FIG. 4b), the longitudinal axis 35 of the vehicle body is inclined to the rear as indicated by the arrow 38. As a consequence, the inclination sensor 19 provides a negative signal, for example, for the pitch angle θ with respect to the reference level 45.

In FIG. 7c), the occupant 30 has entered the vehicle through a rear door and is located e.g. on one of the rear seats 27-3, 27-4, or 27-5 (see FIG. 3). As indicated again by the arrow 38, the longitudinal axis 35 of the vehicle body is inclined to the rear in a similar manner as shown in FIG. 7b), but to a greater extent. With respect to the situation as shown in FIG. 7b), the inclination sensor 19 provides a signal for the pitch angle θ having the same sign, but a greater magnitude.

Figure 8:
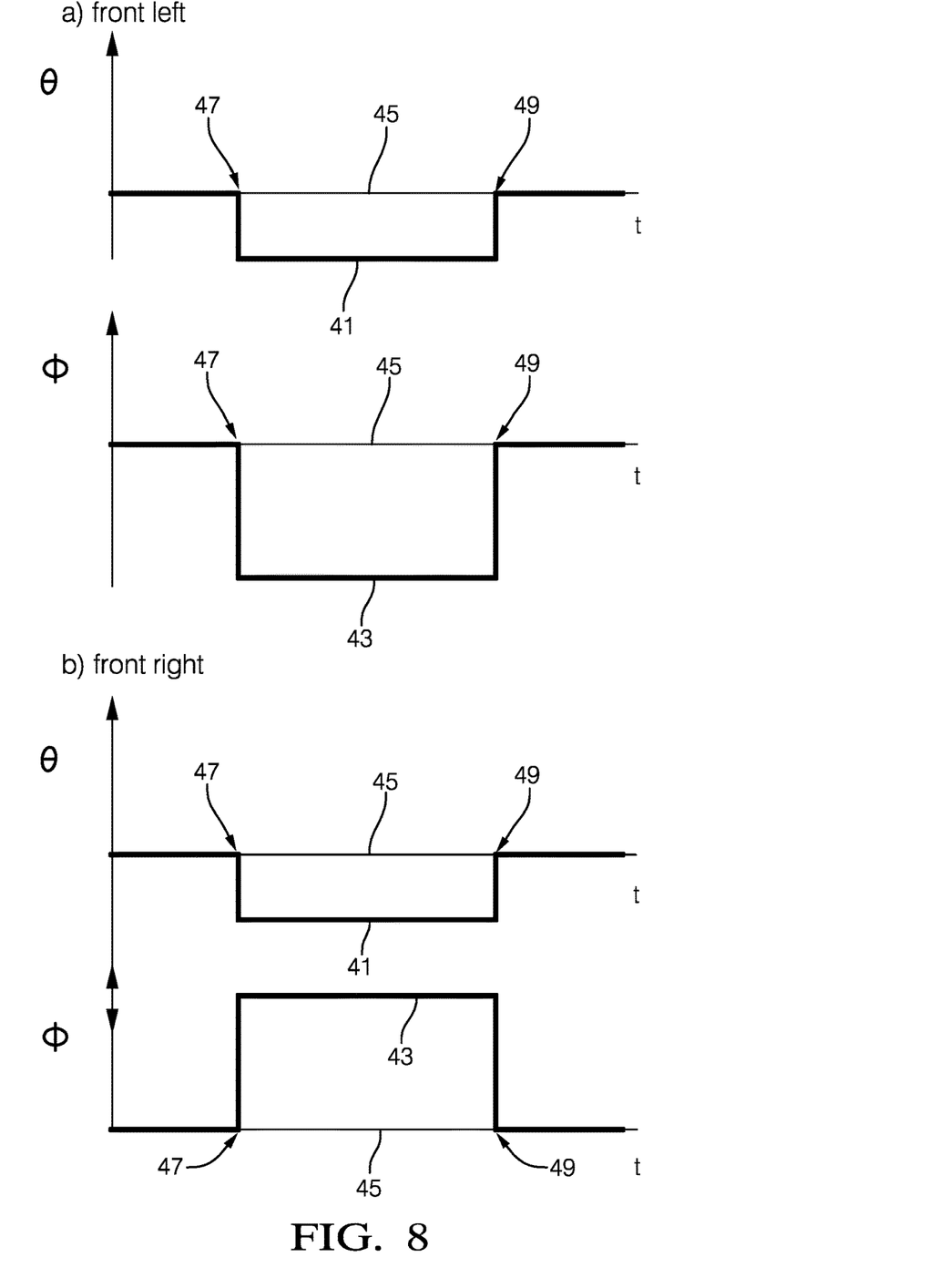
FIG. 8 depicts an example for signals of an inclination sensor for the vehicle according to FIG. 7.
Figure 9:
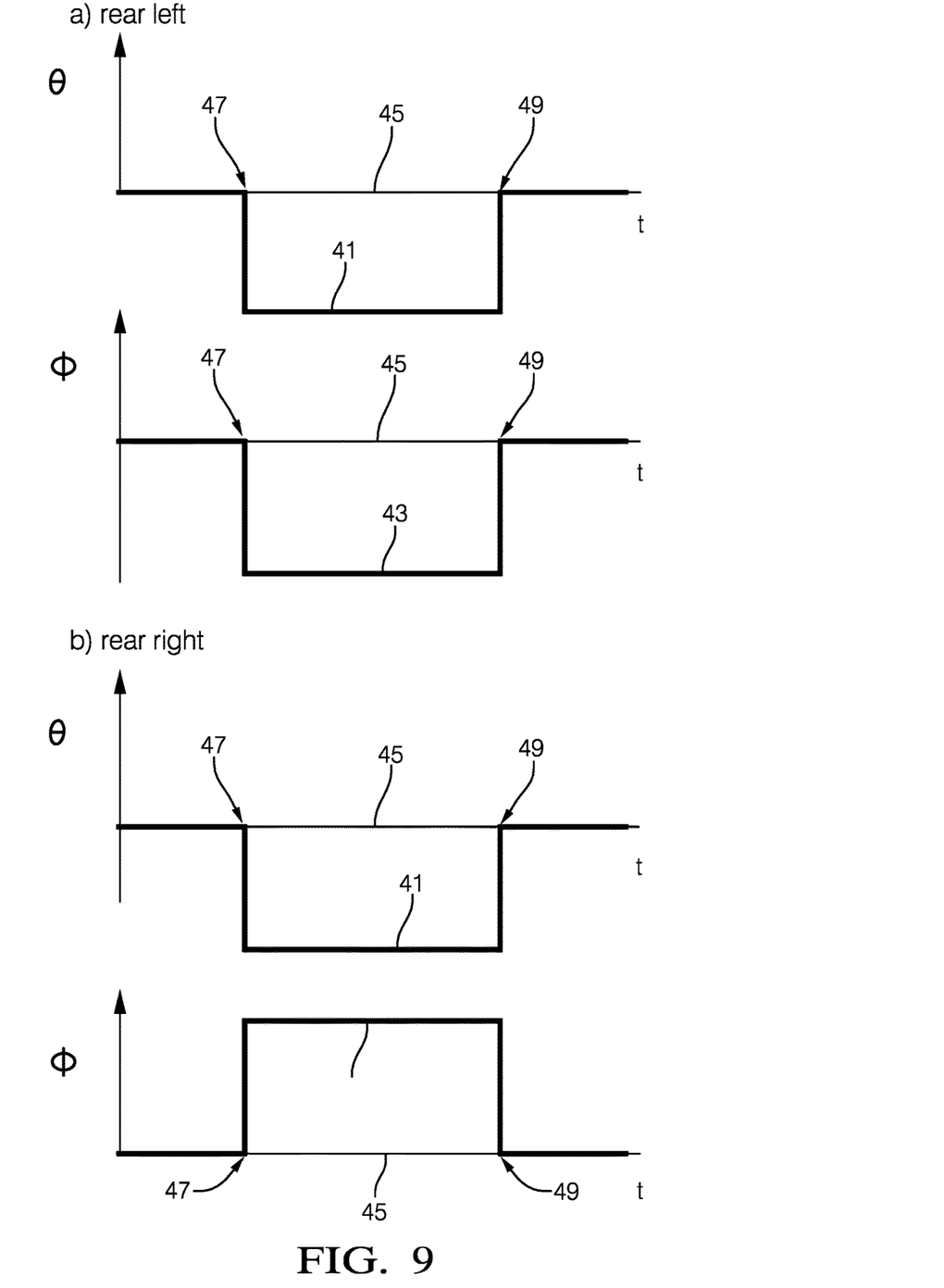
FIG. 9 depicts another example for signals of the inclination sensor for the vehicle according to FIG. 7.

The signals depicted in FIGS. 8 and 9 correspond to the situations as shown in FIGS. 7b) and 7c), respectively. In contrast to the situations in which the signals shown FIGS. 5 and 6 are determined, the center of gravity of the vehicle 11 is located close to the front suspension 41 (see FIG. 7a) for the signals depicted in FIGS. 8 and 9.

In FIG. 8, the signals 41, 43 of the inclination sensor 19 are depicted for an occupant entering the compartment 13 of the vehicle 11 at the instant of time indicated by 47 through the front left door (FIG. 8a)) or through the front right door (FIG. 8b)) and leaving the vehicle 11 again at the instant of time indicated by 49.

At the instant of time indicated by 47, the longitudinal signal 41 (pitch angle θ) decreases indicating a rearward inclination of the vehicle 11 as shown in FIG. 7b). At the same instant of time indicated by 47, the lateral signal 43 (roll angle φ) decreases as well with respect to the baseline 45 indicating an inclination of the vehicle 11 to the left side.

If the occupant enters the vehicle 11 through the front right door (see FIG. 8b), the longitudinal signal 41 (pitch angle θ) decreases in the same manner as shown in FIG. 8a)

indicating a rearward inclination of the vehicle 11 as well. The lateral signal 43 (roll angle ϕ), however, increases at the instant of time indicated by 47 instead of the decrease as shown in FIG. 8a). Due to the different sign of the lateral signal 43 (roll angle ϕ) with respect to the corresponding lateral signal 43 shown in FIG. 8a), the lateral signal 43 shown in FIG. 8b) indicates an inclination of the vehicle 11 to the right side.

In FIG. 9, the signals 41, 43 are depicted for an occupant entering the compartment 13 of the vehicle 11 through the rear left door (FIG. 9a)) or alternatively through the rear right door (FIG. 9b)) at the instant of time indicated by 47 and leaving the vehicle again at the later instant of time indicated by 49. The only difference for the signals 41, 43 shown in FIG. 9 with respect to the signals shown in FIG. 8 relates to the longitudinal signals 41 (pitch angle θ) which decrease by a greater extent with respect to the baseline 45. That is, the longitudinal signals 41 (pitch angle θ) shown in FIGS. 8 and 9 have the same sign (if the baseline 45 is regarded as zero level) and differ by magnitude only.

In order to localize an occupant 30 within the compartment 13, it is therefore necessary either to calibrate the longitudinal signal 41 (pitch angle θ) regarding the magnitude or to consider at least one signal of a further sensor. For example, the signal of the ultrasonic sensor 17 may be used in order to determine whether an occupant 30 is located in one of the front seats 27-1, 27-2. If not, the occupant 30 is located in one of the rear seats 27-3, 27-4, 27-5 or behind these.

Figure 10:
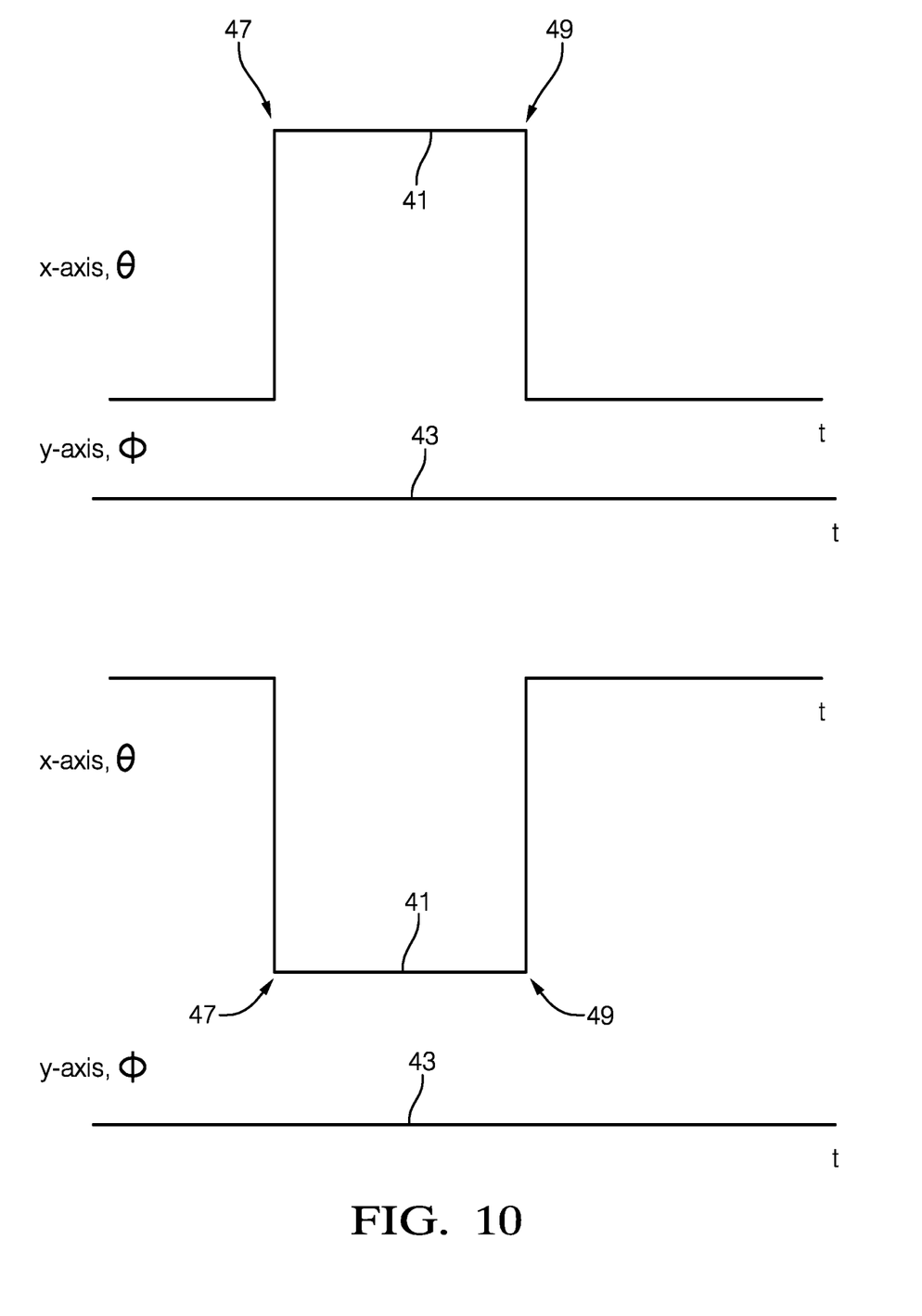
FIG. 10 depicts a further example for signals of the inclination sensor.

In FIG. 10, situations are depicted in which two occupants are entering and leaving the vehicle 11 through both front doors or both rear doors, respectively, at the same time. For the situations shown in FIG. 10, it is assumed that the two occupants have almost the same weight. Therefore, the two occupants balance each other in lateral direction of the vehicle, and the lateral signal 43 of the inclination sensor 19 (y-axis or roll angle ϕ) neither increases nor decreases with respect to the baseline 45. In addition, it is assumed that the center of gravity of the vehicle 11 is located in the middle between the front and rear suspensions 31, 33 as shown in FIG. 4a).

The longitudinal signals 41 (x-axis or pitch angle θ), however, increase (FIG. 10a)) or decrease (FIG. 10b)) by greater amounts than for the situations shown in FIGS. 5 and 6. That is, a stronger inclination of the vehicle to the front side is indicated by the longitudinal signal 41 as shown in FIG. 10a), whereas a stronger inclination to the rear side of the vehicle 11 is indicated by the longitudinal signal 41 as shown in FIG. 10b).

Since the lateral signal remains constant in FIG. 10a) and the longitudinal signal 41 increases, the presence of a respective occupant in both of the left front section 29-1 and the right front section 29-2 (see FIG. 3) is determined based on the signals 41, 43 as depicted in FIG. 10a). In a similar manner, the presence of a respective occupant in both of the left rear section 29-3 and the right rear section 29-4 is determined from the signals as shown in FIG. 10b). In general, the amount of change of the longitudinal signal 41 and of the lateral signal 43 depends on the weight of the occupants, the suspension system of the vehicle 11 and the position of the center of gravity 24 (see FIGS. 2, 4 and 7) of the vehicle 11. In addition, the position of the center of gravity 24 of the vehicle 11 affects the sign of a change of the longitudinal signal 41 (x-axis or pitch angle θ).

For the situations as shown in FIGS. 5, 6 and 10, the localization of one or two occupants within the predefined sections 29-1 to 29-4 is merely based on the sign or direction of change of the longitudinal signal 41 and of the lateral signal 43, wherein one of the signals additionally remains constant as shown in FIG. 10. Moreover, if the absolute value of the signals 41, 43 is taken into account and calibrated with respect to thresholds being estimated for the vehicle 11 under consideration, the localization of occupants within the vehicle 11 may be refined. In detail, by a calibration of the longitudinal signal 41 a presence of an occupant in the region of the sections 29-3 and 29-4 corresponding to the rear seats 27-3, 27-4 may be distinguished from the presence of an occupant on the auxiliary seats 27-6 and 27-7 behind, i.e. in the trunk section 29-5.

In addition, the presence of an occupant on the seat 27-5 in the middle between the rear seats 27-3 and 27-4 may be identified by a longitudinal signal 41 and a lateral signal 43 similar to those as shown in FIG. 10b) in which the longitudinal signal 41 decreases by a smaller amount. In other words, a situation as shown in FIG. 10b) in which two occupants are localized on the rear seats 27-3, 27-4 can be distinguished from a situation in which one occupant is seated on the rear middle seats 27-5 if a suitable calibration of the longitudinal signal 41 is available.

Figure 11:
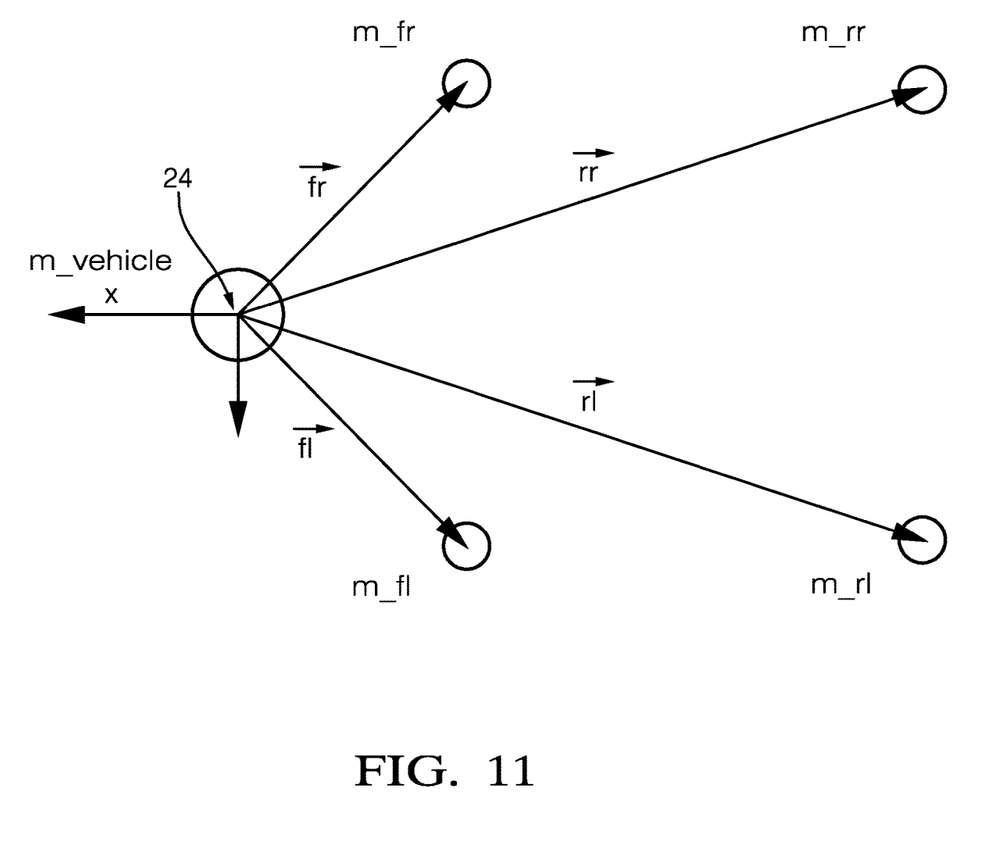
FIG. 11 depicts a schematic diagram for a change of the center of gravity.

FIG. 11 depicts a schematic illustration for a further refinement of the localization of occupants within the compartment 13 if more than one occupant 30 are involved. Based on the signals of the inclination sensor 19, a change $\overrightarrow{\Delta ms}$ of the center of gravity 24 due to the occupants may be calculated as follows:

$$\overrightarrow{\Delta ms} = \frac{\vec{rr} \cdot m_{rr} + \vec{fr} \cdot m_{fr} + \vec{fl} \cdot m_{fl} + \vec{rl} \cdot m_{rl}}{m_{vehicle} + m_{rr} + m_{fr} + m_{fl} + m_{rl}}$$

As shown in FIG. 11, the vectors $\vec{rr}$, $\vec{fr}$, $\vec{fl}$ and $\vec{rl}$ are position vectors of the respective masses $m_{rr}$, $m_{fr}$, $m_{fl}$ and $m_{rl}$ of occupants being located at a respective one of the seats 27-1, 27-2, 27-3 and 27-4. The position vectors refer to an origin of a coordinate system being located at the center of gravity 24 of the vehicle. For the example of FIG. 11, the center of gravity 24 is located close to the front suspension 31 as is also shown in FIG. 7a). $m_{vehicle}$ represents the mass of the vehicle which is arranged around the center of gravity 24 in the simplified illustration of FIG. 11.

Based on the change $\overrightarrow{\Delta ms}$ of the center of gravity 24, the masses of the occupants may be estimated if the position vectors $\vec{rr}$, $\vec{fr}$, $\vec{fl}$ and $\vec{rl}$ are linearly independent and one row of seats 27 is occupied only. By the signal of the ultrasonic sensor 17, it may be detected whether the front seats 27-1, 27-2 are occupied or not. In vehicles in which e.g. the vectors $\vec{fr}$ and $\vec{fl}$ are linearly dependent the determination of masses is not possible by this means.

Furthermore, a door status of vehicle doors may additionally be considered. If up to two doors of the vehicle are detected as being open, for example, by doors sensors, the possible position vectors are known which need to be considered, and the equation for $\overrightarrow{\Delta ms}$ may be solved for the corresponding masses. In addition, if the direction of $\overrightarrow{\Delta ms}$ is not aligned with one of the position vectors $\vec{rr}$, $\vec{fr}$, $\vec{fl}$ and $\vec{rl}$, the longitudinal and lateral signals 41, 43 of the inclination sensor 19 must be a superposition of changes of at least two positions corresponding to at least two occupants 30.

We claim:

1. A method for localizing an occupant within a vehicle, the method comprising:

transmitting an ultrasonic signal from an ultrasonic sensor in a compartment of the vehicle;

identifying that at least one occupant is present within the vehicle based on detecting at least the ultrasonic signal, determining information regarding an inclination of the vehicle based on at least one signal of an inclination sensor, and determining whether the occupant is present in one of a plurality of predefined sections of the vehicle based on the information regarding the inclination of the vehicle and activating at least one additional device within the vehicle for a predefined period based on determining that the occupant is present in one of the plurality of predefined sections of the vehicle.

2. The method according to claim 1, comprising determining at least one reference level for the at least one signal of the inclination sensor when no presence of any occupant is indicated by the signal of the ultrasonic sensor.

3. The method according to claim 1, wherein the inclination sensor provides a longitudinal inclination signal indicating the inclination of the vehicle with respect to a longitudinal axis of the vehicle and a lateral inclination signal indicating the inclination of the vehicle with respect to a lateral axis of the vehicle, and the plurality of predefined sections are related to ranges of the longitudinal inclination signal and the lateral inclination signal.

4. The method according to claim 3, wherein the plurality of predefined sections comprises at least two sections and the presence of the occupant in one of the plurality of predefined sections is determined based on at least one of a sign of the longitudinal inclination signal and a sign of the lateral inclination signal.

5. The method according to claim 1, wherein:

the information regarding the inclination of the vehicle comprises a change of the at least one signal of the inclination sensor, and the change is greater than a predetermined threshold within a predefined time period.

6. The method according to claim 5, wherein a number of occupants entering or leaving the vehicle is determined by the change of the at least one signal of the inclination sensor.

7. The method according to claim 1, comprising determining if a powertrain of the vehicle is switched off as a prerequisite to determining whether the at least one occupant is present in one of the plurality of predefined sections of the vehicle.

8. The method according to claim 1, wherein the at least one additional device is configured to localize the occupant within the vehicle in order to confirm the presence of the at least one occupant in one of the plurality of predefined sections of the vehicle.

9. The method according to claim 1, wherein the presence of the at least one occupant within the vehicle is identified based on a movement and/or a respiration of the occupant which is detected based on the signal of the ultrasonic sensor.

10. A computer system configured to carry out the method of claim 1.

11. A non-transitory computer readable medium comprising instructions for carrying out the method of claim 1.

12. A system for localizing an occupant within a vehicle, comprising:

an ultrasonic sensor configured to transmit an ultrasonic signal in a compartment of the vehicle and to detect at least the transmitted ultrasonic signal;

an inclination sensor providing at least one signal indicating an inclination of the vehicle;

a localization module that receives an indication from the ultrasonic sensor and the at least one signal of the inclination sensor, wherein the localization module is configured to determine that the occupant is present in the vehicle based on the indication from the ultrasonic sensor and to determine that the occupant is in one of a plurality of predetermined sections of the vehicle based on the at least one signal of the inclination sensor; and at least one additional device within the vehicle that is activated for a predefined period based on the localization module determining that the occupant is present in the one of the plurality of predefined sections of the vehicle.

13. The system according to claim 12, wherein the inclination sensor is configured to provide a longitudinal inclination signal indicating the inclination of the vehicle with respect to a longitudinal axis of the vehicle and a lateral inclination signal indicating the inclination of the vehicle with respect to a lateral axis of the vehicle, and the predetermined sections are related to ranges of the longitudinal inclination signal and the lateral inclination signal.

14. The system according to claim 12, wherein the localization module is configured to determine at least one reference level for the at least one signal of the inclination sensor when the indication from the ultrasonic sensor does not indicate the presence of any occupant within the vehicle.

15. The system according to claim 12, wherein the at least one additional device within the vehicle is configured to localize the occupant within the vehicle to confirm the presence of the occupant in one of the plurality of predefined sections of the vehicle.

* * * * *